United States Patent [19]

Lee et al.

[11] Patent Number: 6,088,907
[45] Date of Patent: Jul. 18, 2000

[54] METHOD FOR FABRICATING A HEAD/ SLIDER ASSEMBLY INTEGRATED WITH A TRACK-FOLLOWING MICRO ACTUATOR

[75] Inventors: Hyo-Jung Lee; Woo-Kyeong Seong, both of Kyoungki-Do, Rep. of Korea

[73] Assignee: Institute for Advanced Engineering, Seoul, Rep. of Korea

[21] Appl. No.: 09/149,108

[22] Filed: Sep. 9, 1998

[51] Int. Cl.[7] .................................................. G11B 5/42
[52] U.S. Cl. .................................. 29/603.03; 29/603.12; 29/603.15
[58] Field of Search ........................... 29/603.03, 603.12, 29/603.13, 603.14, 603.15

[56] References Cited

U.S. PATENT DOCUMENTS 5,802,701  9/1998  Fontana et al. ...................... 29/603.03

*Primary Examiner*—Carl E. Hall
*Attorney, Agent, or Firm*—Jacobson, Price, Holman & Stern, PLLC

[57] ABSTRACT

A head/slider assembly is integrated with a track-following electrostatic micro actuator. A method for fabricating the head/slider assembly includes the steps of: forming a micro actuator structural layer on a slider substrate with a cavity formed therebetween; forming metal signal lines on the micro actuator structure layer; forming the read/write magnetic head on a central part of the micro actuator structure layer; etching to separate the micro actuator and the read/ write magnetic head; and forming a protective cover on top of the micro actuator and the read/write magnetic head to form the head/slider assembly, to thereby make the assembly to allow it to be used in a HDD system of a very high track density having a track pitch of 1 $\mu$m and a recording density of more than 10 Gb/in$^2$.

4 Claims, 8 Drawing Sheets

METHOD FOR FABRICATING A HEAD/ SLIDER ASSEMBLY INTEGRATED WITH A TRACK-FOLLOWING MICRO ACTUATOR

FIELD OF THE INVENTION

The present invention relates to a head/slider assembly for use in a hard disk drive (HDD); and, more particularly, to a head/slider assembly integrating therein a track-following micro actuator and method for fabricating the same.

DESCRIPTION OF THE PRIOR ART

As is well known, a hard disk drive (HDD) performs a track seeking and a track following by using a voice coil motor (VCM) actuator. However, since such a VCM actuator has a limited precision and a maximum recording density of 5 Gb/in$^2$, it is impossible for it to be used by itself in, e.g., a HDD system of a very high track density having a 1 $\mu$m track pitch and a recording density of more than 10 Gb/in$^2$.

Accordingly, a dual stage servo system is generally incorporated in such a HDD system to additionally move to a read/write head to a selected track exactly two or three tracks of 2–3 $\mu$m with the VCM actuator performing only the track seeking in driving and controlling a displacement of the 1 $\mu$m track pitch.

Referring to FIG. 1, there is shown such a dual stage servo system. As shown, the dual stage servo system includes a suspension 3 mounted onto a rotating shaft 2 to be rotatable thereabout in response to an activation of the VCM 1, for performing the track seeking during a rotation thereof in a diametral direction of a disk 6, and a head/slider assembly for performing the track following so as to drive and control of the displacement of the 1 $\mu$m track pitch and then to record or read data on or from the track on the disk 6, wherein a micro actuator 5 and a read/write magnetic head (not shown) are assembled on a slider 4 to be mounted on a tip end of a suspension 3. In such a conventional head/slider assembly, the track following is performed by employing a slider driving type or a head driving type.

In a head/slider assembly of the slider driving type, the micro actuator is mounted between a suspension arm consisting of a gimbals spring and the slider on which the read/write head is fixedly assembled. The track following is performed by activating the slider through the driving of the micro actuator. In such a slider/head assembly of the aforementioned type, the micro actuator capable of driving the slider approximately one thousand times the weight of the head is needed, causing its overall size to increase, which, in turn, complicate the manufacturing process thereof.

There is shown in FIG. 2 an electrostatic micro actuator used in a head/slider assembly of the head driving type. As shown, the electrostatic micro actuator attached onto the slider is provided with a plurality of stationary combs 9, each of the stationary combs having a plurality of comb frames and each of the comb frames being formed with N number of fingers, a multiplicity of movable combs 10, each of the movable combs having a plurality of comb frames and each of the comb frames being formed with N+1 number of fingers, the fingers being mounted to reciprocate linearly between the fingers of the stationary comb 9, a head mounting board 11 installed on a central part of the movable comb 10 and a read/write head 12 positioned on a side of the head mounting board 11.

Meanwhile, the stationary comb 9 is electrically insulated and attached onto the slider 4 by using a bonding agent, and the movable comb 10 is supported by flexible springs 13 of a predetermined elastic coefficient, positioned at opposite end parts thereof.

In the electrostatic micro actuator 5 constructed in this manner, when a control signal voltage is fed to the stationary comb 9, an electrostatic force is exerted on the stationary and the movable combs 9 and 10 to thereby draw the movable comb 10 toward the stationary comb 9. At this time, the movable comb 10 performs the track following by balancing the electrostatic force and the elasticity of the spring.

However, in such an conventional head/slider assembly, it is extremely difficult to connect the micro actuator and the magnetic head to the slider for track following. Further, is extremely difficult to obtain a head/slider assembly in which the micro actuator is protected from extraneous substances.

SUMMARY OF THE INVENTION

It is, therefore, a primary object of the present invention to provide a head/slider assembly integrated therein a track-following micro actuator to allow it to be used in a HDD system of a very high track density and method for fabricating the same.

The above and other objects of the invention are accomplished by providing a method for fabricating a head/slider assembly integrated with an track-following electrostatic micro actuator, the method comprising the steps of: forming a micro actuator structure layer on a slider substrate with a cavity formed therebetween; forming metal signal lines on the micro actuator structure layer; forming a read/write magnetic head on a central part of the micro actuator structure layer; etching to separate the micro actuator and the read/write magnetic head; and forming a protective cover on top of the micro actuator and the read/write head to form the head/slider assembly.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 3:
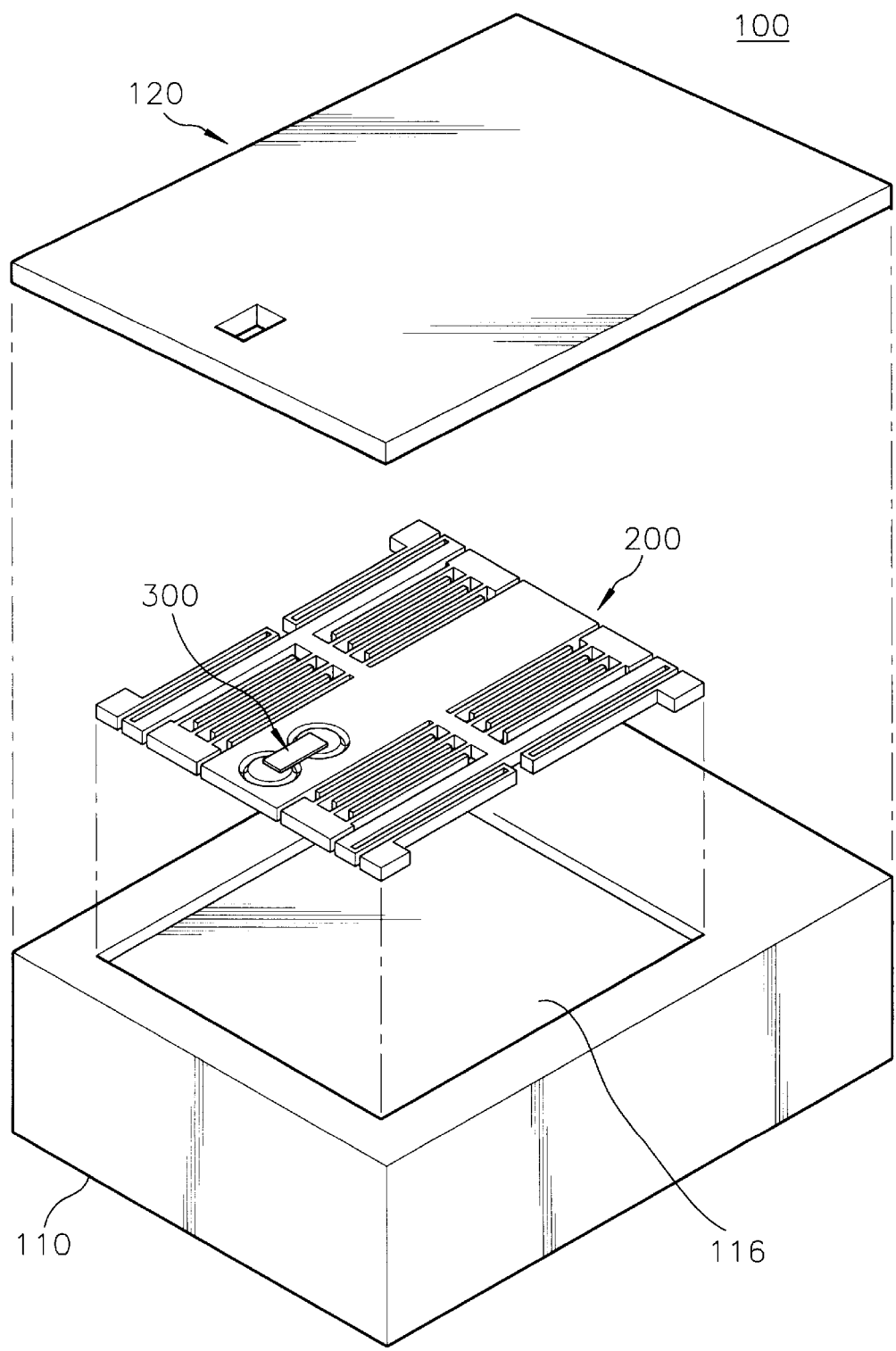
FIG. 3 illustrates an exploded perspective view of a planar type head/slider assembly in accordance with a preferred embodiment of the present invention.

Referring to FIG. 3, there is shown a planar type slider/ head assembly in accordance with a preferred embodiment of the present invention. As shown, the planar type head/ slider assembly 100 includes a slider body 110 having a cavity 116 on an upper part thereof and being made of a silicon wafer, an electrostatic micro actuator 200 mounted on the slider body 110 with a read/write head 300 formed on top thereof, and a protective cover 120 bonded around an upper periphery of the slider body 110 so as to protect the head/slider assembly 100 from extraneous substances.

Figure 1:
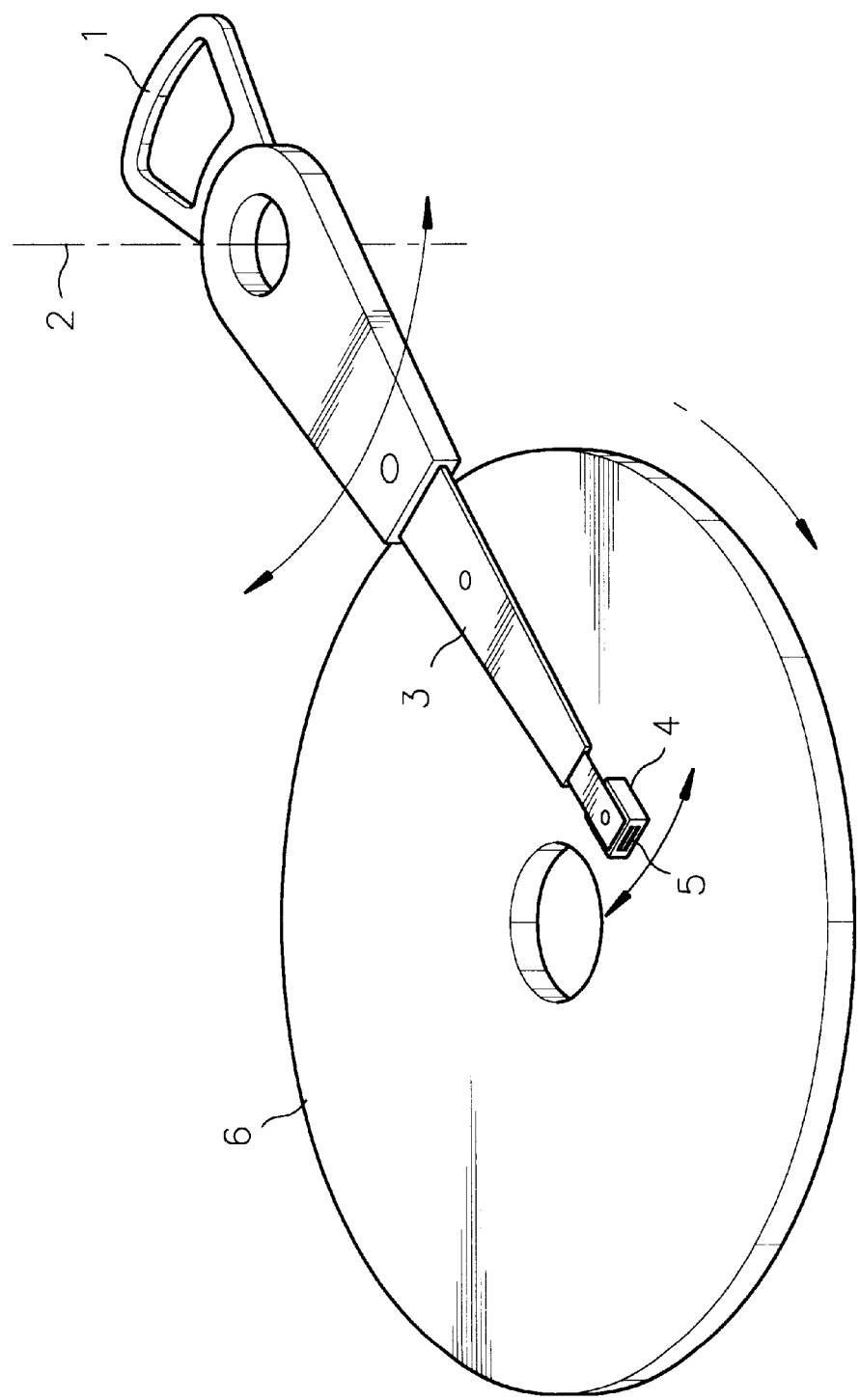
FIG. 1 shows a dual stage servo system for use in a HDD.
Figure 2:
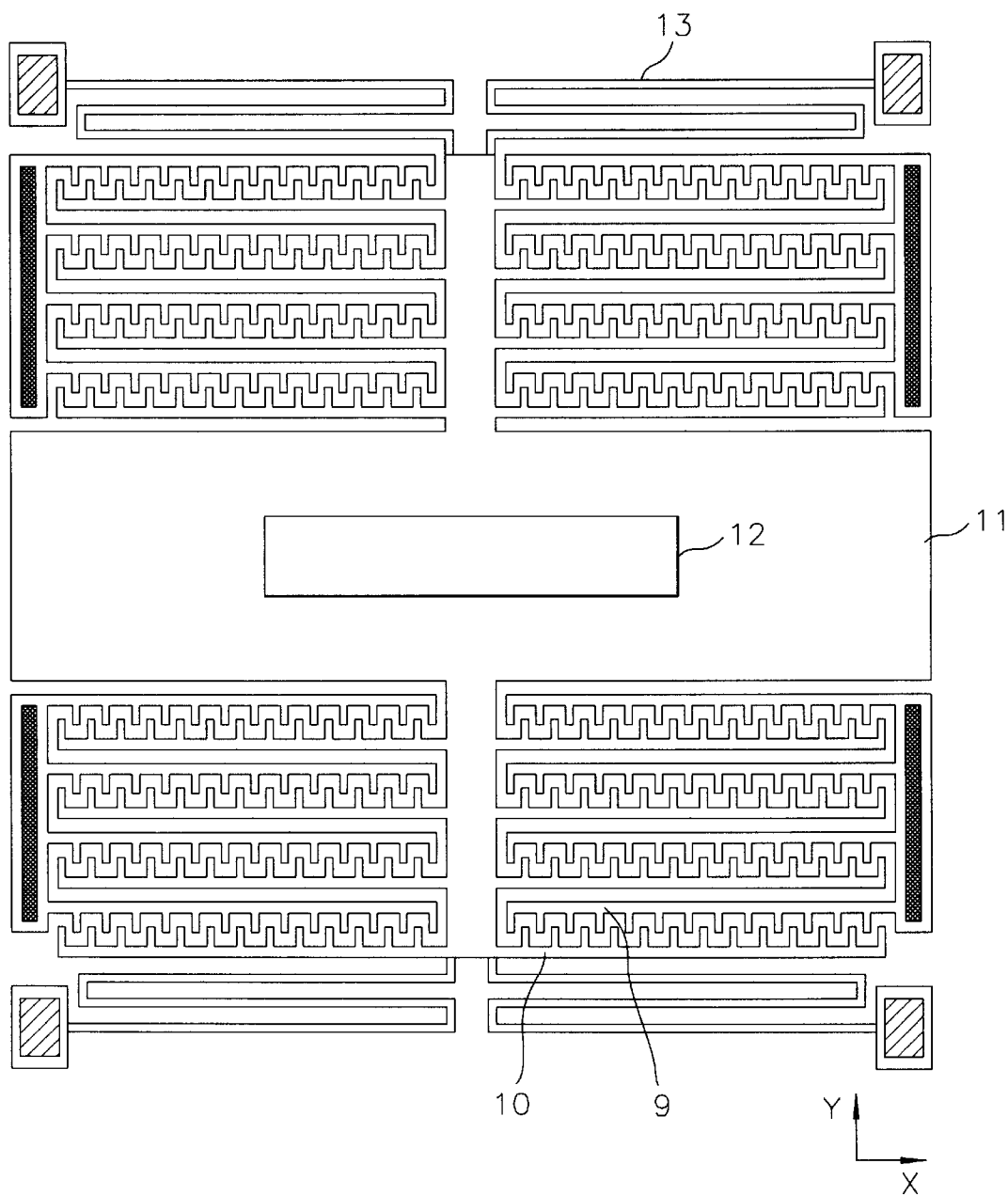
FIG. 2 represents a micro actuator employed in a head driving type.

The functions of the electrostatic micro actuator 200 are same as described in FIG. 2 to be omitted.

Referring to FIG. 4, there is shown a manufacturing process of the planar type head/slider assembly 100 in accordance with the preferred embodiment of the present invention.

Figure 4A:
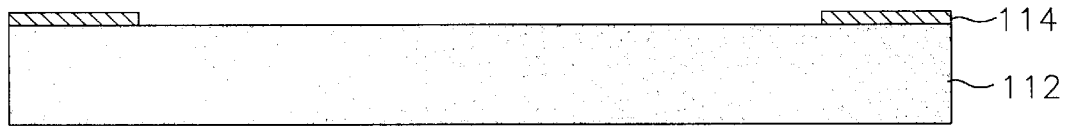
FIGS. 4A to 4n depict a manufacturing process of the planar type head/slider assembly shown in FIG. 3.
Figure 4B:
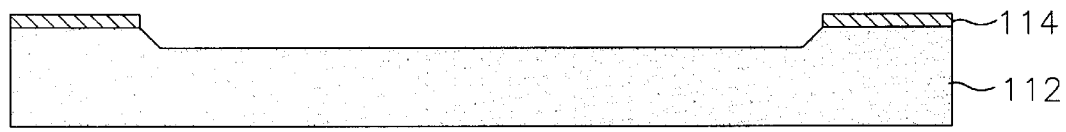

First of all, a mask layer 114 made of a thermal silicon oxide ($SiO_2$) is deposited on top of a slider substrate 112 made of a silicon wafer, and then patterned to partially expose the slider substrate 112 as shown in FIG. 4a. In a following step, the exposed part of the slider substrate 112 is etched until a desire depth is obtained as shown in FIG. 4b.

Figure 4C:
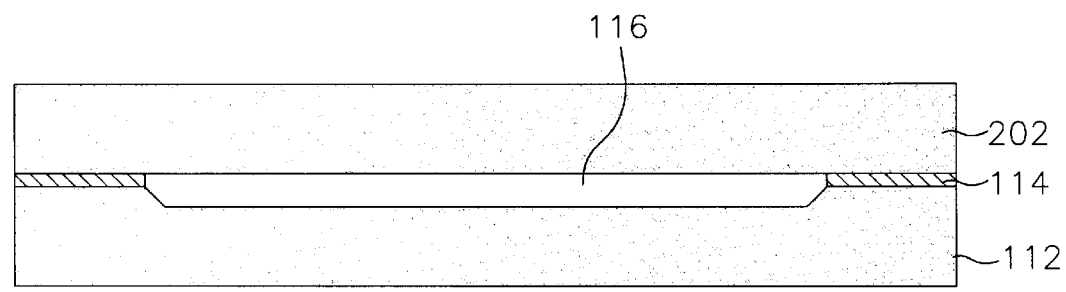
Figure 4D:
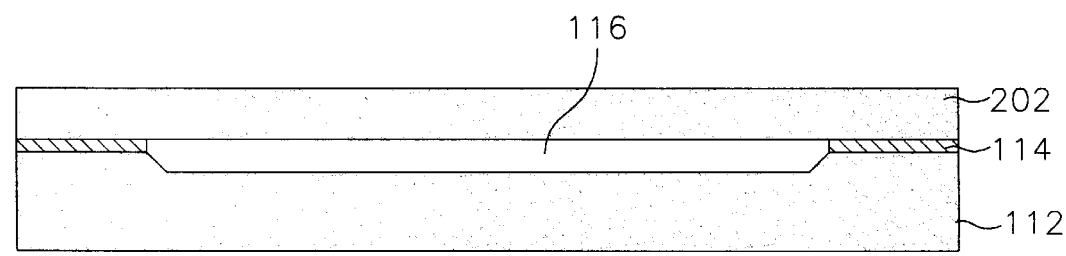

Subsequently, as illustrated in FIG. 4c, a micro actuator structure layer 202 made of a silicon wafer is bonded to the structure shown in FIG. 4b by using a fusion bonding method to thereby cover the etched portion. Thereafter, as shown in FIG. 4d, the micro actuator structure layer 202 is polished by using a chemical mechanical polishing (CMP) until a desired thickness is obtained. As a result of the bonding and polishing the micro actuator structure layer 202, a cavity 116 is formed.

Figure 4E:
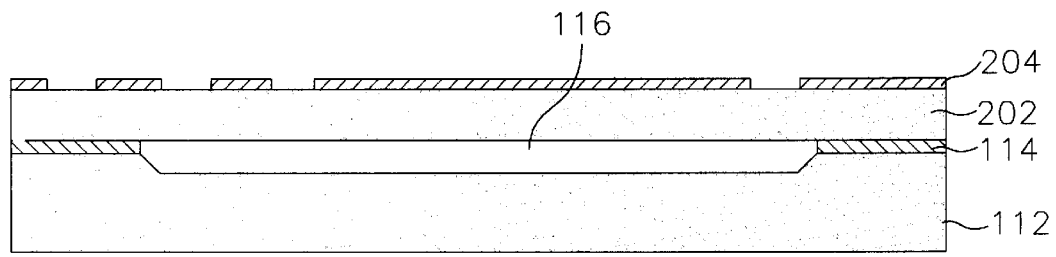
Figure 4F:
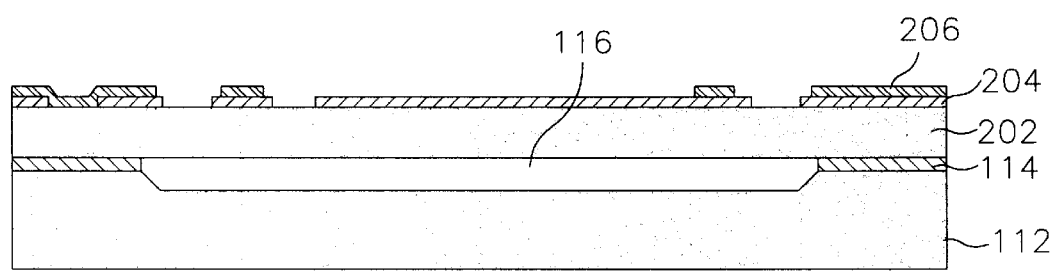

Then, a first insulating layer 204 made of a silicon nitride ($Si_3N_4$) is deposited on top of the micro actuator structure layer 202, and then patterned to partially expose the micro actuator structure layer 202 as shown in FIG. 4e. Thereafter, a metal layer is deposited on the first insulating layer 204, and then patterned to partially expose the micro actuator structure layer 202 and the first insulating layer 204, as shown in FIG. 4f, and to form metal signal lines 206.

After the above steps, a read/write head 300 to be connected to the metal signal lines 206 is formed on top of the micro actuator structure layer 202 as illustrated in FIGS. 4g through 4l, by way of a lower magnetic yoke forming step, a coil forming step, a middle magnetic yoke forming step and an upper magnetic yoke forming step.

Figure 4G:
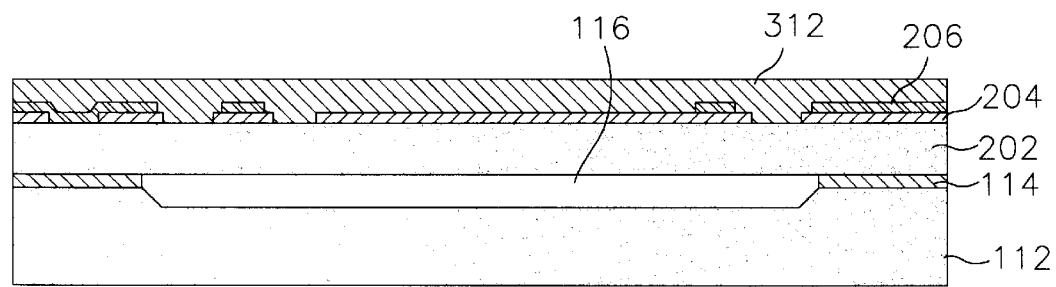
Figure 4H:
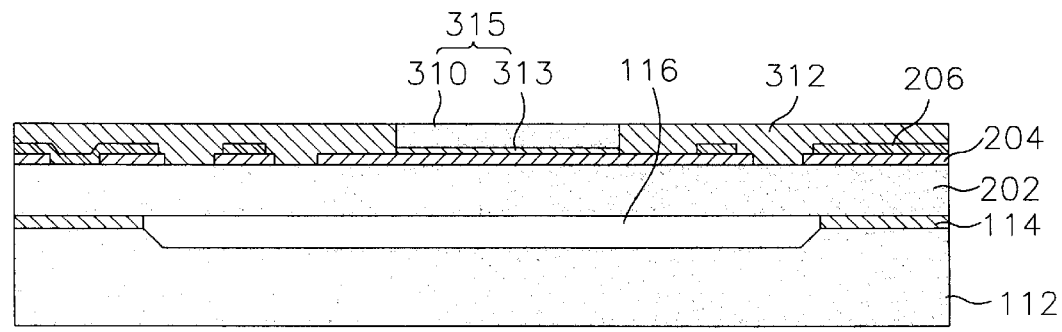

The lower magnetic yoke 315 is formed by: depositing an oxide layer 312 on top of the metal signal lines 206, the first insulating layer 204 and the micro actuator structure layer 202 and planarizing it as disclosed in FIG. 4g; partially etching the oxide layer 312 until a portion of the first insulating layer 204 is exposed; depositing successively a first conductive thin film 313 and a second magnetic thin film 310 made of FeNi by using an electroplating method on top of the exposed portion of the first insulating layer 204 in such a way that the thin films 310 and 313 completely fill the etched portion of the oxide layer 312 as shown in FIG. 4h.

Figure 4I:
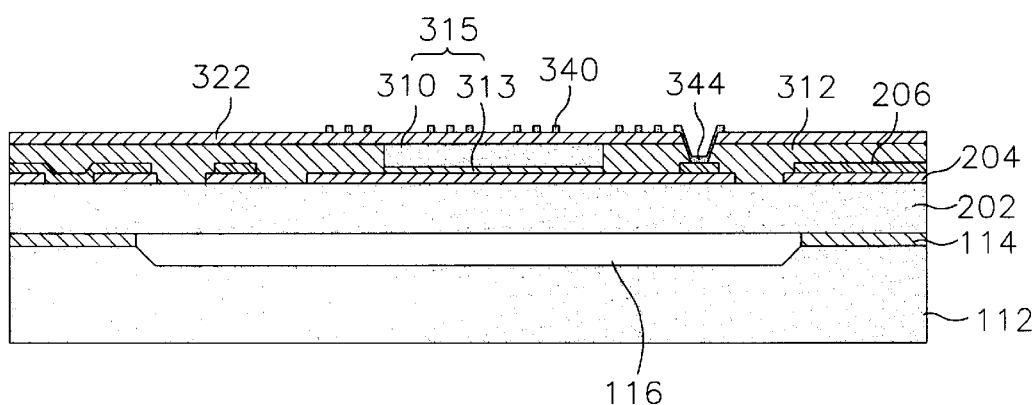

The aforementioned coil forming step includes: depositing a second insulating layer 322 on top of the lower magnetic yoke 315; forming a via hole 334 electrically connected to the metal signal lines 206; and depositing and patterning a conductive thin film on the second insulating layer 322 to form the coil 340, as shown in FIG. 4i.

Figure 4J:
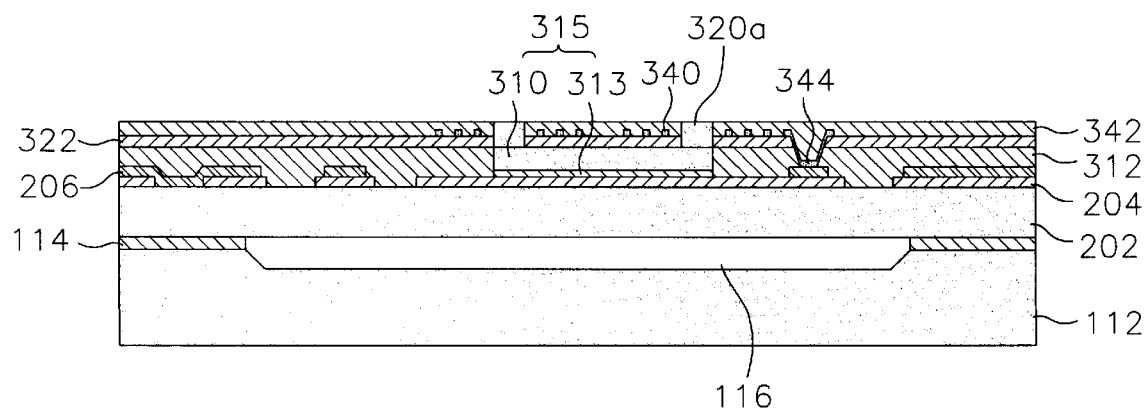

Next, as shown in FIG. 4j, a third insulating layer 342 is deposited on top of the second insulating layer 322 including the coil 340. Thereafter, portions of the second insulating layer 322 and the third insulating layer 342, the portions being separated by the lower magnetic yoke 315, are etched until the first magnetic thin film 310 is exposed. The etched portions of the insulating layers 322 and 342 are then filled with a magnetic material to thereby form a first middle magnetic yoke 320a.

Figure 4K:
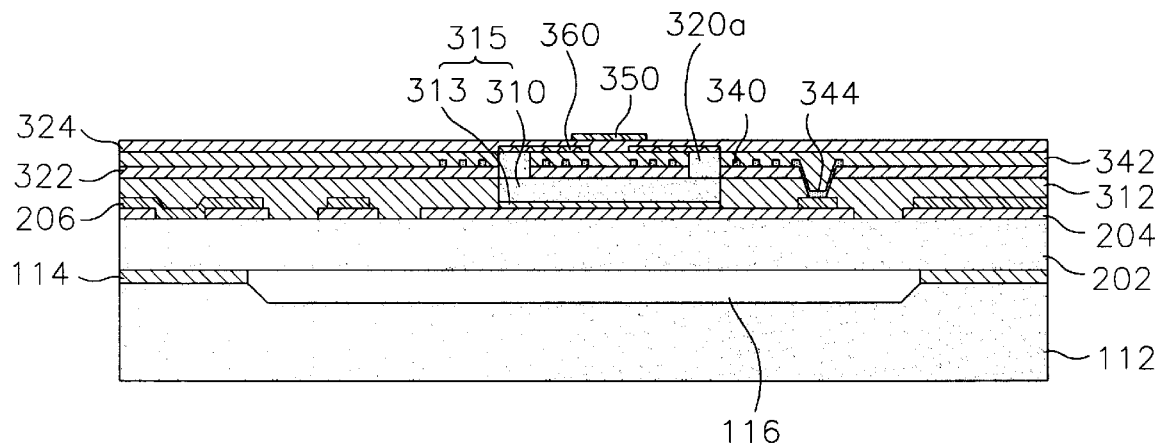

Thereafter, as illustrated in FIG. 4k, a magnetic field concentrator 360 is first formed on top of the first middle magnetic yoke 320a, and then patterned in such a way that a portion of the third insulating layer 342 is exposed. A fourth insulating layer 324 is then deposited on top of the third insulating layer 342 including the magnetic field concentrator 360. In an ensuing step, a magnetroresistive (MR) layer 350 for reading data recorded on a disc is formed at a position corresponding to a center of the magnetic field concentrator 360.

Figure 4L:
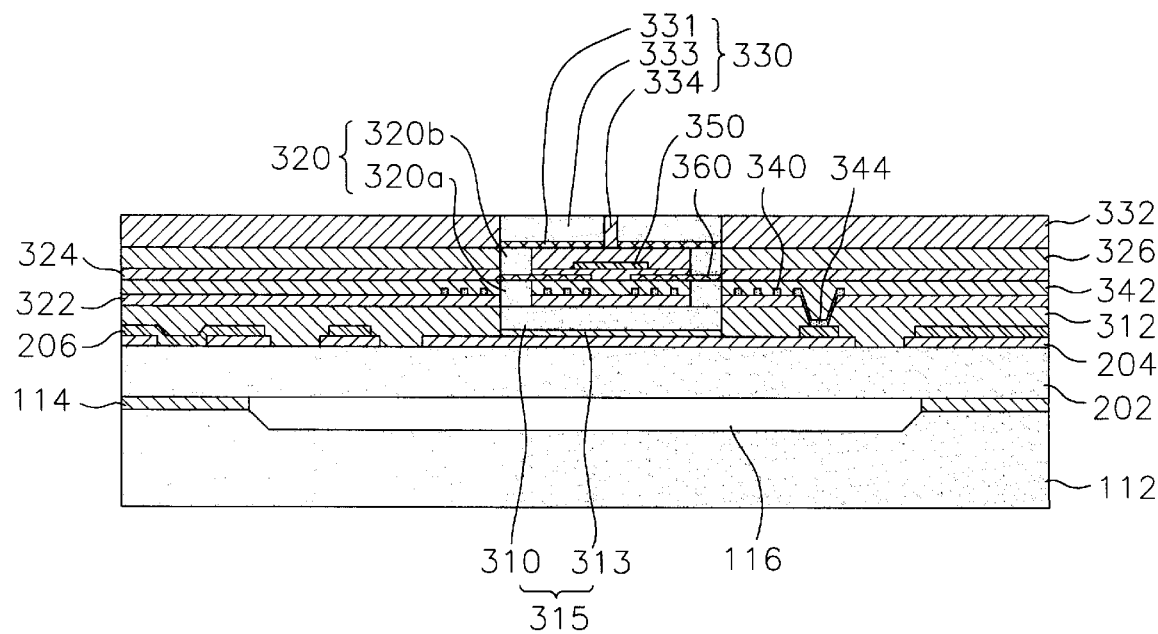

Thereafter, as shown in FIG. 4l, a fifth insulating layer 326 is deposited on top of the fourth insulating layer 324 including the MR layer 350. Then, a second middle magnetic yoke 320b is then formed by etching a portion of the fourth insulating layer 324 and the fifth insulating layer 326 corresponding to an upper portion of the first middle magnetic yoke 320a until the magnetic field concentrator 360 is exposed and then filling the etched portion with a magnetic thin film.

Next, a second conductive thin film 331 is formed on the second middle magnetic yoke 320b. Then, a sixth insulating layer 332 is deposited on top of the fifth insulating layer 326 including the second conductive thin film 331, and then etched until the second conductive thin film 331 is exposed, the etched portion being filled with a second magnetic thin film 333 by using an electroplating method. Thereafter, the second magnetic thin film 333 and the second conductive thin film 331 are etched until a center portion of the fifth insulating layer 326 is exposed, the etched portion being filled with a third conductive thin film 334 by using an electroplating method to thereby form a magnetic head gap. As a result, an upper magnetic yoke 330 for recording data on a disc including the second conductive thin film 331, the second magnetic thin film 333 and the third conductive thin film 334 is obtained.

Figure 4M:
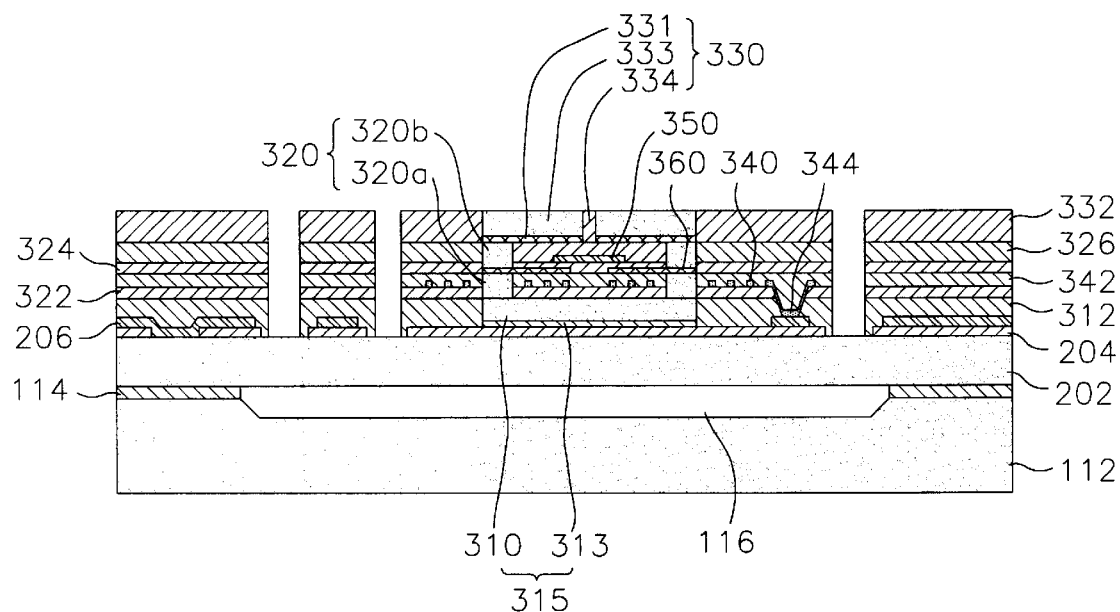
Figure 4N:
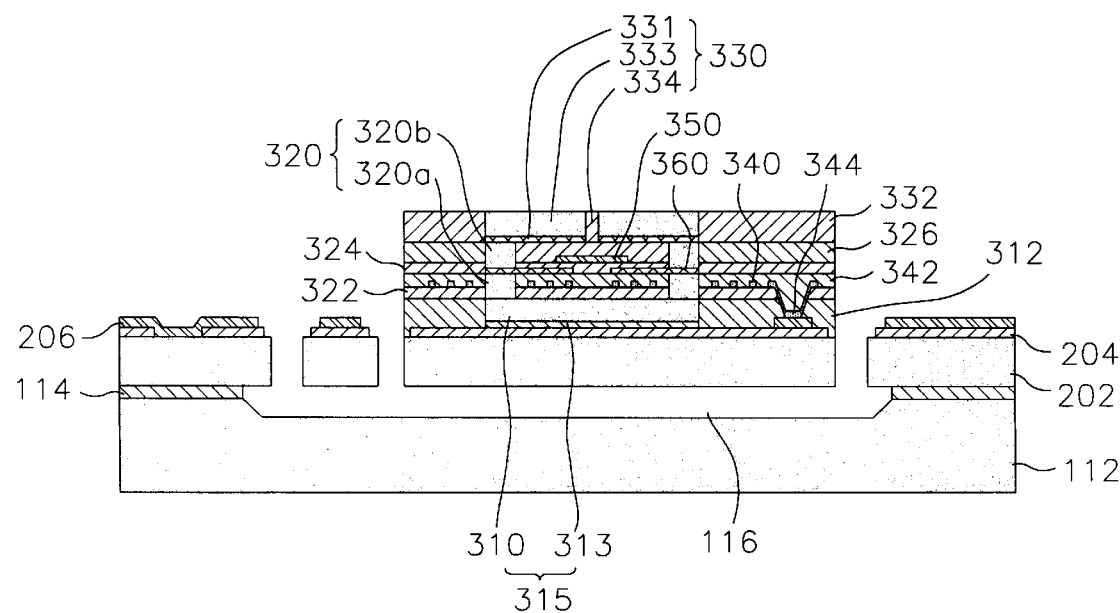

The following describes an etching process for obtaining a final shape of the head and the track-following micro actuator constructed in the above described manner with reference to FIGS. 4m and 4n.

The micro actuator 200 and the read/write magnetic head 300 are separated by performing a reaction ion etching (RIE) on both lateral sides of the magnetic yokes 315, 320 and 330 and a moving part of the micro actuator 200 adjacent to one side of the read/write magnetic head 300, as shown in FIG. 4m, and then performing a deep reactive ion etching to pattern the micro actuator 200, as illustrated in FIG. 4n.

In an ensuing step, as shown in FIG. 3, a protective cover 120 for protecting the assembly from extraneous substances is bonded to cover around the periphery of the slider body 110 integrated with the micro actuator 200 and the read/write head 300 to thereby obtain the inventive slider/head assembly.

As described above, although a preferred embodiment of the invention has been described for a planar type head/slider assembly, it is not limited to this and may be used in manufacturing a vertical type head/slider assembly including a read/write head vertically installed on a rear part of the slider body.

While the present invention has been described with respect to the preferred embodiment, it will be understood by those skilled in the art that certain changes and modifications may be made without departing from the scope of the invention as defined in the following claims.

What is claimed is:

1. A method for fabricating a head/slider assembly integrated with an track-following electrostatic micro actuator, including the steps of:

a) forming a micro actuator structure layer on a slider substrate with a cavity formed therebetween;

b) forming metal signal lines on the micro actuator structure layer;

c) forming a read/write magnetic head on a central part of the micro actuator structure layer;

d) etching to separate the micro actuator and the read/write magnetic head; and e) forming a protective cover on top of the micro actuator and the read/write magnetic head to form the head/slider assembly.

2. The method as recited in claim 1, wherein the cavity is formed by the steps of:

a1) forming a mask layer made of thermal silicon oxide ($SiO_2$) on the slider substrate and patterning the same;

a2) etching a portion of the slider substrate until a desired depth is obtained; and a3) bonding the micro actuator structure layer to the slider substrate by using a fusion bonding method.

3. The method as recited in claim 1, wherein the metal signal lines are formed by the steps of:

b1) depositing a first insulating layer on top of the micro actuator structure layer and patterning the same to partially expose the micro actuator structure layer; and b2) depositing a metal layer on the first insulating layer and patterning the same to partially expose the micro actuator structure layer and the first insulating layer.

4. The method as recited in claim 1, wherein the micro actuator and the read/write magnetic head are separated by performing a reactive ion etching on lateral sides of the magnetic yokes and a moving part of the micro actuator adjacent to one side of the read/write magnetic head; and performing a deep reactive ion etching to pattern the micro actuator.

\* \* \* \* \*